United States Patent [19]
Koshelev

[11] 3,944,036
[45] Mar. 16, 1976

[54] CLUTCH WITH PISTON MODULATING VALVE

[76] Inventor: Vladimir Alexeevich Koshelev, ulitsa Zverinetskaya, 14, kv. 46, Moscow, U.S.S.R.

[22] Filed: Mar. 31, 1975

[21] Appl. No.: 563,305

[52] U.S. Cl. ...... 192/109 F; 192/109 A; 192/106 F; 91/401
[51] Int. Cl.² .......................................... F16D 25/00
[58] Field of Search ....... 192/85 AA, 109 F, 109 A, 192/106 F, 87.17

[56] References Cited
UNITED STATES PATENTS

| | | | |
|---|---|---|---|
| 2,386,220 | 10/1945 | Lawler et al. | 192/85 AA |
| 2,670,828 | 3/1954 | McFarland | 192/106 F |
| 2,720,866 | 10/1955 | Maki et al. | 192/85 AA |

Primary Examiner—Benjamin W. Wyche
Attorney, Agent, or Firm—Lilling & Siegel

[57] ABSTRACT

A multi-disc hydraulically operated friction clutch is provided with valve means in the form of longitudinally split plugs received in the drain openings of the plunger and varying the flow passage area of these openings, depending on the position of the plunger. Said plugs of the valve means are displaced, on the one hand, by the contact thereof with the pressure disc of the clutch, and, on the other hand, by their abutting against the housing of the clutch. By selecting the ratings of the valve means, i.e., the dimensions of the drain slit in the plugs, it is possible to ensure any required degree of smoothness of engagement of the clutch, the pressure disc acting upon the package of the friction discs with a gradually varying effort, proportional to the rate of draining of the working fluid through the plunger.

4 Claims, 6 Drawing Figures

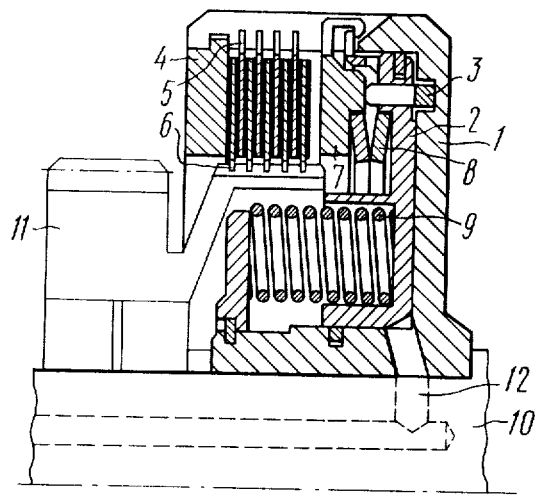
FIG. 1
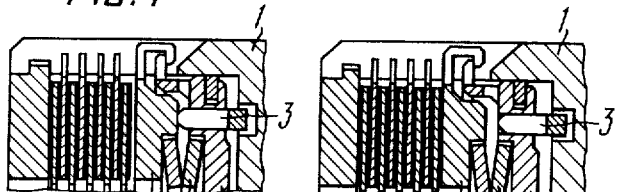
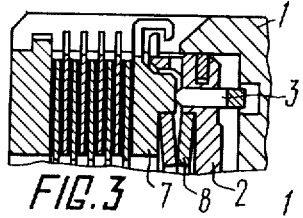
FIG. 2
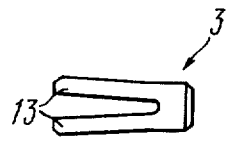
FIG. 5
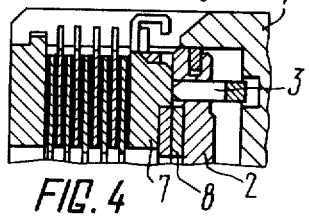
FIG. 3
FIG. 6
FIG. 4

CLUTCH WITH PISTON MODULATING VALVE

The present invention relates to hydraulically operated multi-disc friction clutches of the type used in the power transmissions of motor vehicles, tractors and various road construction machines. More particularly, the present invention relates to compact friction clutches of a specified type, which include sets of driven and driving discs which are drivingly connected upon hydraulically initiated engagement of the clutch, when the working fluid acts upon a plunger displaced along the axis of the housing of the clutch jointly with a pressure disc adapted to effect driving engagement of the driving and driven discs.

Moreover, the present invention relates to above-described structures of clutches, wherein the plunger is provided with through-going drain openings extending parallel to the axis of the plunger adjacent to the periphery thereof, so that with the plunger and the pressure disc spread apart by the action of an intermediate resilient member, the working fluid drains through these openings upon disengagement of the clutch.

At present, there are widely employed throughout the world multi-disc friction clutches marketed by "Borg Warner," "Twin Disc," "Clark Equipment" companies in the USA, by the French "Richier" company and several others.

In the structure of the clutches marketed by Borg Warner there are employed stepped plungers with internal and external spaces communicating through calibration orifices. The increasing of the pressure of the working fluid and, consequently, the smoothness of engagement of these clutches will be ensured by the appropriate selection of the calibration orifices.

Among the disadvantages of the known friction clutches are the tendency of the calibration openings and cavities of the cylinders to get clogged with foreign particles, the relatively great longitudinal dimension of the clutches, the increased requirements as to the characteristics of the oil employed as the working fluid and to its purity.

To ensure working capacity of said clutch, it is necessary to employ filters ensuring fineness of purification not more than 20 microns.

An improved friction clutch with through-going drain orifices located adjacent to the periphery of the plunger to accelerate disengagement of the clutch is disclosed in the U.S. Pat. No. 3,362,481, wherein, among other things, there is noted that with the pressure of the working fluid discontinued, the resilient members move the plunger away from the adjacent plate, it is at this moment that the through-going orifices in the plunger become open, so that the working fluid is able to drain therethrough. When this clutch is being engaged, the plunger is tightly pressed to the adjacent disc or plate, and the orifices therein are closed.

Among the disadvantages of clutches of the last-described kind there is the fact that throughout the idle stroke of the plunger toward the engagement position, the working fluid drains through the orifice, whereby the time of this idle stroke is increased, thus prolonging the total pre-engagement time. Besides, for this reason the passage area of the drain orifices cannot be made great enough, which increases the time of disengagement of the clutch. In clutches of this kind it is relatively difficult to control draining of the working fluid during engagement.

It is an object of the present invention to provide a hydraulically operated multi-disc friction clutch, which would ensure a predetermined smooth engagement characteristic and a required timing of disengagement.

It is another object of the present invention to provide a multi-disc friction clutch which would offer smooth engagement under hydraulic control and which would have a compact axial dimension and be reliable in operation.

Among other objects of the present invention is the provision of a multi-disc clutch having the abovesaid advantages and being of a relatively simple and inexpensive structure, capable of reliable operation with decreased requirements to the characteristics of the oil used as the working fluid and to its purity, in comparison with similar clutches of the prior art.

These and other objects are accomplished in the herein proposed hydraulically operated multi-disc friction clutch, comprising sets of driving and driven plates or discs that can be drivingly connected upon engagement of the clutch, the clutch having mounted in the housing thereof an axially movable plunger having drain orifices made therethrough adjacent to the periphery thereof, the clutch further including a pressure disc normally spaced from the plunger under the action of an intermediate member and return springs adapted to return the plunger into its initial position upon disengagement of the clutch, the clutch in accordance with the present invention being characterized in that the drain orifices in the body of the plunger are normally closed with valve means which are normally closed during the disengaged state of the clutch and during the idle stroke of the plunger, each valve means being associated with a controllable member adapted to interact with the pressure disc upon relative displacement of the pressure disc and the plunger, so that the less spaced are the disc and the plunger, the more displaced is this controllable member of the valve means, whereby the flow passage area of the drain orifices is varied.

The herein disclosed structural improvement of the friction clutch of the specified type provides for smooth engagement of the clutch when the plunger has started compression of the package of the driving and driven discs, the deflection of the engagement-controlling springs being accompanied by displacement of the controllable members of the valve means whereby there is effected smooth predetermined draining of the working fluid through the space between the plunger and the pressure disc.

In accordance with one possible embodiment of the present invention, the multi-disc friction clutch is characterized in that the controllable members of the valve means are made in the form of longitudinally split plugs slidably mounted in the through-going axially extending openings of the plunger and movable therein by the pressure disc, the longitudinal slit of each plug, in addition to presenting the drain orifice variance its flow passage area upon the motion of the plug, also forming at the tail part of the plug radially spread, resiliently deformable portions which retain the plug in the opening of the plunger against spontaneous displacement directly under the action of the pressure of the working fluid, the said plugs being mounted for the ends thereof to abut against the housing of the clutch, for the plugs of the valve means to return into their initial position upon returning of the plunger into the initial position thereof.

With the valve means having this structure, it becomes possible to ensure in the simplest way the required smooth displacement of the controllable member of the valve means, i.e., of the split plug, and the variation of the passage area of the drain orifice, i.e., of the slit of the plug, in strict compliance with the displacement of the plug relative to the housing of the clutch. As it has been already mentioned hereinabove, the split structure of the plugs also precludes their spontaneous displacement in the openings of the plunger only under the action of the pressure of the working fluid, thus ensuring that the plugs are retained in the openings to be displaced therein exclusively by their direct mechanical contact with the pressure disc on the one hand and the housing of the clutch on the other hand.

According to still another embodiment of the present invention, the multi-disc friction clutch is characterized in that the intermediate resilient member interposed between the plunger and the pressure disc is in the form of disc spring means of which the effort is sufficient to spread apart the plunger and the pressure disc upon discontinuation of the static clutch-engaging pressure.

The incorporation of the disc spring means with the abovespecified effort is a structurally optimal feature, ensuring positive spreading apart of the plunger and pressure disc after the pressure of the working fluid has been discontinued for disengagement of the clutch.

Still another improvement of the herein proposed structure of the friction clutch resides in that, in accordance with the present invention, the multi-disc friction clutch is characterized by at least one of the normally closed valve means, in order to remove from the housing the working fluid that has incidentally found its way into the housing with the clutch disengaged, providing for bleeding of the working fluid therethrough to prevent unintentional engagement of the clutch.

The above arrangement ensures in a simple way reliable performance of the clutch, the pre-calculated volume of bleeding of the working fluid through at least one of the valve means relieving the cylinder from the working fluid finding its way into the cylinder incidentally, whereby unintentional engagement of the clutch is precluded.

Other features and advantages of a multi-disc friction clutch in accordance with the present invention will be made apparent in the description of an embodiment thereof, to follow hereinbelow, with reference being had to the accompanying set of drawings, wherein:

FIG. 1 is a longitudinally sectional view of a friction clutch embodying the invention; FIG. 2 is a sectional view illustrating the portion of the clutch embodying the invention, at the initial moment of taking up the gaps between the friction plates or discs;

FIG. 3 illustrates the portion of the clutch, shown in FIG. 2, during draining of the working fluid through the valve means, as the clutch slips under load;

FIG. 4 illustrates the same portion of the clutch embodying the invention, with the clutch fully engaged;

FIG. 5 illustrates the same portion of the clutch, during draining of the working fluid from the booster device at disengagement of the clutch;

FIG. 6 shows the plug of the drain valve means of the clutch illustrated in FIGS. 1 to 5.

Referring now to the appended drawings, the multi-disc friction clutch consists of a housing 1 (FIGS. 1 to 5) provided with an annular cylindrical space, to be hereinafter referred to as the cylinder, wherein there are accommodated a plunger 2, a back plate or disc 4, four driving discs 5, five driven discs 6, a pressure disc 7, two engagement-controlling disc springs 8, twelve return springs 9 and twelve plugs 3 received in the drain openings of the plunger 2.

The housing 1 is rigidly connected with a driving shaft 10, e.g., by means of a key-and-slot connection and is provided in the peripheral wall with through-going slots which act as splines meshing with the splines of the driving discs 5.

The driven discs 6 are internally splined to mesh with the splines of the driven member of the transmission, e.g., with a gear 11 drawn in thin lines in FIG. 1.

Driving torque is transmitted from the driving discs 5 to the driven discs 6 by the friction forces therebetween at compression of the package of the discs. Such compression of the package of the discs is effected by the plunger 2 acting thereupon through the engagement-controlling disc springs 8 and the pressure disc 7, under the action of a working fluid supplied under pressure into the housing 1 beneath the plunger 2 via passages 12 shown with dash lines in FIG. 1.

The periphery of the plunger 2 has splines cut therein to preclude rotation of the plunger relative to the housing 1. The same splines are used for connection of the plunger 2 with the pressure disc 7 which is urged away from the plunger by the effort of the disc springs 8 that are pre-compressed to a specified extent at assembling of the clutch.

Adjacent to the periphery of the plunger 2, in the portions thereof facing the pressure disc 7 there are cut drain openings receiving therein axially slidable, longitudinally split plugs 3, acting as the controllable valve members of the valve means formed with their help. At the tail thereof each plug 3 has resiliently flaring portions 13 (FIG. 6), which is essential to retain the plug 3 in the respective drain opening of the plunger 2 against spontaneous displacement under the pressure of the fluid. As it can be seen in FIGS. 2, 3, 4 and 5 these portions of the plug 3 are compressed in the respective opening of the plunger 2 and bear thereagainst, thus producing a force of friction ensuring that the plug 3 is retained in the opening so that it can be displaced therein exclusively under the action of either the disc 7 or the housing 1.

The plugs 3 interact with the pressure disc 7 upon relative displacement of the pressure disc 7 and the plunger 2, so that the closer together come the disc 7 and the plunger 2, the more displaced becomes the plug 3, whereby the flow passage area of the valve means formed in the respective drain opening of the plunger is varied.

The clutch according to the present invention, operates as follows.

The working fluid under pressure is supplied into the housing 1 to displace the plunger 2 toward the driving and driven discs 5 and 6. As is shown in FIG. 2, as the gaps between the discs are being taken up, which constitutes the idle strokes of the plunger 2, the latter and the pressure disc 7 are displaced as a unit, the drain openings at this stage being closed off with the plugs 3, precluding draining of the working fluid therethrough, which speeds up the initial stage of the engagement and thus reduces the time of interruption of the power flow at gear shift. Then the pressure disc 7 abuts against the package of the driving and driven discs, and, as shown in FIG. 3, the disc springs 8 are deflected; simultaneously, the plugs 3 are being displaced in the respective openings of the plunger 2, initiating draining of the working fluid from the housing 1. At this stage the clutch slips under the load, the effect of compression of the discs 5 and 6 being determined by the rigidity of the engagement-controlling disc springs 8, and the timing of engagement being defined by the rate of draining of the working fluid through the valve means wherein the flow passage area is defined by the longitudinally split plugs.

By appropriate selection of the disc springs 8 and by altering the flow passage area opened by the split plugs 3 it is possible to preset the time of engagement of the herein disclosed clutch and to obtain the required smoothness of engagement.

At the presently described stage of the operating cycle of the clutch the displacement of the plug 3 in the respective opening of the plunger 2 is effected by the effort developed by the plunger, the effort being sufficiently great to ensure reliable performance of the clutch.

At the end of its engagement stroke the plunger 2 abuts directly against the pressure disc 7 and closes off the drain openings (FIG. 4), the plugs 3 being forced completely into the respective openings.

Thus, with the herein disclosed clutch fully engaged, draining of the working fluid from the housing 1 is cut off, which decreases leakage of the fluid, increases the pressure applied to the plunger 2 and opposes sedimentation in the housing 1 of the products of decomposition of the working fluid and of foreign matter.

With the clutch fully engaged the effort compressing the package of the discs 5 and 6 is maximal, and the clutch transmits the entire torque.

Disengagment of the herein disclosed clutch is effected by establishing communication between the passage 12 shown with dash lines in FIG. 1 and the drain. The effort of the engagement-controlling disc springs 8 is pre-selected so that the joint effort of these springs, when the clutch fully engaged, and the effort of the regurn springs should be positively greater than the effort applied to the plunger by the working fluid under the action of centrifugal force. This being ensured, the plunger 2 clears the pressure disc 7, as can be seen in FIG. 5, the drain orifices, i.e., the slits in the plugs 3 become open, and the working fluid is drained therethrough from the housing. At this stage of the operating cycle the return springs 9 retract the plunger 2 into its initial position shown in FIG. 1, the plungs 3 abutting against the housing 1 and thus being displaced in the openings of the plunger 2 to close off the drain slits. The clutch is now ready for another engagement-disengagement cycle. At the last-described stage the plugs 3 are displaced by the effort of the return spring 5. This effort is pre-selected to be sufficiently great to lead away the plunger and to ensure dependable closing of the drain orifices.

It is expedient that a relatively small slit should be provided in at least one of the plugs 3 to ensure leaking and bleeding of the working fluid that may incidentally find its way from the hydraulic control system into the housing of the clutch in the disengaged state, in which way unintentional engagement of the clutch is precluded.

Thus, the required smoothness of engagement of the clutch is attained, because at the initial stage of compression of the package of the driving and driven discs by the plunger 2 through the disc springs 8 there takes place displacement of the plugs 3 of the valve means, proportional to the deflection of these disc springs 8, and the working fluid is able to drain from the hydraulic cylinder.

The rate of flow of the working fluid through the drain valve means can be varied within a wide range by selecting the corresponding flow passage area of the valve means and their quantity in the plunger. By preselecting the law of variation of the flow passage area of the drain valve means, depending on the displacement of the plugs 3, and the value of the flow passage area of the supply passage of the cylinder, it is possible to control the time-related building up of the pressure in the cylinder and, hence, the rate of engagement of the clutch.

With the disc springs having been deflected to the full degree the plunger 2 abuts against the pressure disc 7 and cuts off draining of the working fluid through the valve means. Consequently, with the clutch fully engaged, no flow of the working fluid through the cylinder takes place, whereby the loss of the pressurized fluid is reduced to a minimum.

The smooth character of engagement of the herein disclosed clutch is achieved by adjusting the pressure in the hydraulic cylinder of the clutch, depending on the displacement of the plunger, which displacement, in its turn, is determined by the variation of the flow passage area of the slit of the plug 3, depending on the displacement of this plug.

A major advantage of the herein disclosed clutch is the fact that during engagement of the clutch the displacement of the plugs of the valve means is effected by the effort of the plunger 2, whereas upon disengagement the plugs are displaced by the effort of the return springs 9, both efforts being sufficiently great to ensure reliable performance of the clutch.

The herein disclosed clutch eliminates the above-mentioned disadvantages of similar clutches of the prior art and, in addition to the improved smoothness of engagement, is more compact and less sensitive, as far as the characteristics of the oil used as the working fluid and its purity are concerned.

I claim:

1. A multi-disc hydraulically operated friction clutch, comprising: a housing; sets of driving and driven discs alternatingly mounted in said housing for engagement and disengagement; a central shaft operatively connected with one of said sets of said discs, while the other said set is operatively connected with said housing; a plunger axially movable in said housing; a pressure disc mounted in said housing for operative interaction with said sets of discs; intermediate spring means normally urging said pressure disc from said plunger; hydraulic power means adapted to supply pressurized working fluid beneath said plunger and to displace it axially against the effort of said intermediate spring means, for said plunger to displace said pressure disc, so that the latter should compress said sets of discs to effect engagement of the clutch; controllable valve means positioned in through-going openings in said plunger adjacent to the periphery thereof and adapted for cooperation with said pressure disc, on the one hand, and with said housing, on the other hand, upon axial displacement of said plunger and said pressure disc; said valve means normally closing said openings in said plunger with the clutch disengaged and with the plunger moving through an idle stroke and opening said openings for draining of the working fluid therethrough in accordance with a characteristic predetermined by the shape of said valve means, in proportion with the relative displacement of said plunger and said pressure disc, so that the closer said plunger and said pressure disc are brought together, the greater is the degree to which the state of the valve means and the flow capacity thereof is altered; resilient return means connected with said plunger for returning same into the initial position thereof upon discontinuation of the action thereupon of said hydraulic power means at disengagement of the clutch.

2. A multi-disc friction clutch, as set forth in claim 1, wherein said valve means include controllable members in the form of longitudinally split plugs slidably received in the axially extending through-going openings in said plunger, adapted to be displaced therein by said pressure disc, the longitudinal slit defining the drainining orifice varying the flow passage area thereof with the displacement of the plug, the same said longitudinal slit defining at the tail of the plug resiliently flaring portions adapted to retain the plug in the respective opening of said plunger against spontaneous displacement directly under the action of the pressure of the working fluid, said plugs being positioned to have the ends thereof abut against the housing to restore said plugs of said valve means to their initial position upon said plunger returning to the initial position thereof.

3. A multi-disc friction clutch, as set forth in claim 2, wherein said intermediate spring means positioned between said plunger and said pressure disc include a disc spring which is precompressed to some value, its effort being sufficient to spread said plunger and said pressure disc apart upon discontinuation of the static pressure applied to engage the clutch.

4. A multi-disc friction clutch, as set forth in claim 1 wherein, in order to provide for bleeding from said housing of the working fluid incidentally finding its way into said housing with the clutch disengaged, at least one of said normally closing valve means in the closed position thereof provides for a desired rate of the leakage of the working fluid therethrough, to preclude unintentional engagement of the clutch.

* * * * *